United States Patent
Sullivan

(10) Patent No.: US 10,683,078 B2
(45) Date of Patent: *Jun. 16, 2020

(54) STIFFENED BEAM ASSEMBLY

(71) Applicant: The Boeing Company, Chicago, IL (US)

(72) Inventor: Kevin Lee Sullivan, Camano Island, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/408,282

(22) Filed: May 9, 2019

(65) Prior Publication Data
US 2019/0263500 A1 Aug. 29, 2019

Related U.S. Application Data

(63) Continuation of application No. 15/093,659, filed on Apr. 7, 2016, now Pat. No. 10,315,751.

(51) Int. Cl.
| | |
|---|---|
| *B64C 3/18* | (2006.01) |
| *B64F 5/10* | (2017.01) |
| *B64C 1/06* | (2006.01) |
| *E04C 3/09* | (2006.01) |
| *E04C 3/04* | (2006.01) |

(52) U.S. Cl.
CPC .............. *B64C 3/187* (2013.01); *B64C 3/185* (2013.01); *B64F 5/10* (2017.01); *E04C 3/09* (2013.01); *B64C 1/065* (2013.01); *E04C 2003/0413* (2013.01); *E04C 2003/0434* (2013.01); *E04C 2003/0452* (2013.01); *E04C 2003/0473* (2013.01); *E04C 2003/0482* (2013.01)

(58) Field of Classification Search
CPC .................................................. B64C 3/187; B64C 3/185; B64C 3/18; B64C 1/065; E04C 3/09; E04C 2003/0413; E04C 2003/0421; E04C 2001/2448
See application file for complete search history.

(56) References Cited

U.S. PATENT DOCUMENTS

| | | | |
|---|---|---|---|
| 1,842,612 | A | 1/1932 | Kahn |
| 1,880,480 | A | 10/1932 | Ragsdale |
| 2,662,272 | A | 12/1953 | Macomber |
| 3,288,977 | A | 11/1966 | Keller |
| 7,140,158 | B2 | 11/2006 | Steadman |
| 7,669,379 | B2 | 3/2010 | Schierding |
| 8,245,971 | B2 | 8/2012 | Makela et al. |
| 10,315,751 | B2 * | 6/2019 | Sullivan .................. B64C 3/187 |

OTHER PUBLICATIONS

U.S. Patent and Trademark Office, Non-Final Office Action regarding U.S. Appl. No. 15/093,659 dated May 15, 2018, 10 pages.
U.S. Patent and Trademark Office, Final Office Action regarding U.S. Appl. No. 15/093,659 dated Sep. 25, 2018, 10 pages.

* cited by examiner

*Primary Examiner* — Richard R. Green
(74) *Attorney, Agent, or Firm* — Kolisch Hartwell, P.C.

(57) ABSTRACT

Methods and apparatuses may include a stiffened beam assembly including a structural beam portion having a web and upper and lower flanges, and at least one continuous stiffening member extending back and forth between the upper and lower flanges on one side of the web, forming one or more trusses or other reinforcing structures. The beam portion and/or the stiffening member(s) may comprise formed sheet metal. The stiffening member(s) may be mechanically attached to the beam portion.

20 Claims, 8 Drawing Sheets

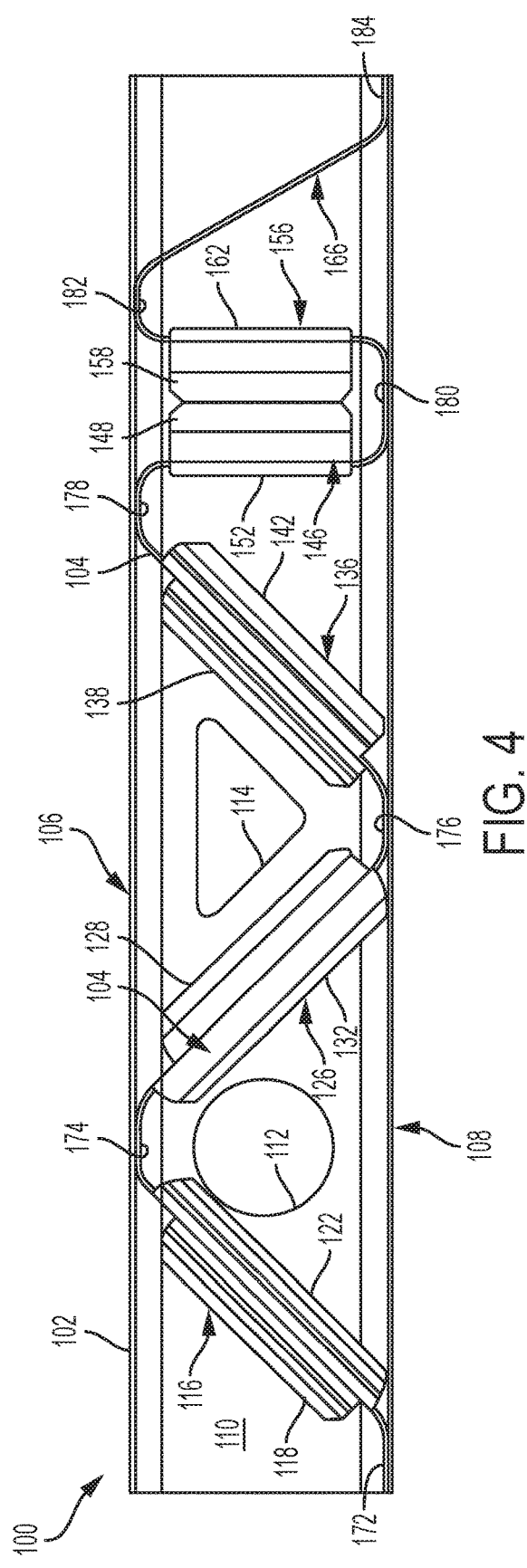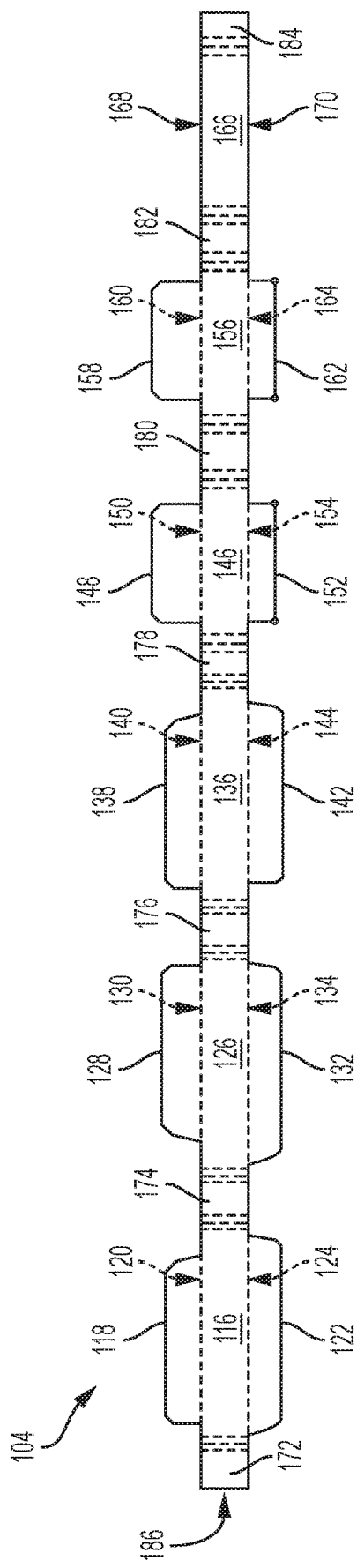

STIFFENED BEAM ASSEMBLY

CROSS-REFERENCE

This application is a continuation application of U.S. patent application Ser. No. 15/093,659, filed Apr. 7, 2016. The complete disclosure of the above-identified patent application is hereby incorporated by reference for all purposes.

FIELD

This disclosure relates to systems and methods for supporting loads using structural beams. More specifically, the disclosed embodiments relate to reinforced or stiffened structural beams.

INTRODUCTION

Structural beams, such as steel I-beams, have been used all over the world for decades, in countless applications having to do with construction of buildings and vehicles (e.g., aircraft), as well as bridges, towers, walls, and other aspects of the construction arts. Structural beams, such as I-beams (also known as H-beams), C-beams, J-beams, and the like, which are usually named based on their sectional profiles, are typically used as load-bearing elements, such as frame members. A primary capability of a beam is its capacity to resist bending. Accordingly, beams are sometimes stiffened using reinforcing elements, which are typically short segments attached piecemeal to the beam. For example, a plurality of vertical segments are sometimes attached between upper and lower flanges of a beam. Such approaches are costly and involve multiple pieces, any one of which may fail, thereby compromising the integrity of the beam.

SUMMARY

Stiffened beam assemblies according to the present teachings provide a solution to the shortcomings described above by providing a structural beam with a single continuous inner stiffening member that extends back and forth between the beam flanges. Benefits of this arrangement may include lower cost, fewer parts, easier and/or automated manufacturability, higher reliability, and/or customizable load bearing characteristics.

The present disclosure provides systems, apparatuses, and methods relating to such stiffened beam assemblies. In some embodiments, an internally-stiffened structural beam assembly may include an elongate beam having a web portion, a first flange, and a second flange spaced from and opposing the first flange across a face of the web portion; and a continuous stiffening member extending alternatingly between the first flange and the second flange along a length of the beam.

In some embodiments, structural beam assembly may include an elongate beam having a web portion and opposing flanges; and a plurality of trusses coupled to the beam and spanning the web between the opposing flanges; wherein the plurality of trusses are formed by a single continuous stiffening member extending back and forth between the opposing flanges along a length of the beam.

In some embodiments, a method of assembling a reinforced structural beam may include forming a beam having a web defining a web plane and opposing flanges extending orthogonal to the web plane; forming a plurality of bends in a continuous metal ribbon to create a corresponding plurality of straight segments configured to extend back and forth between the opposing flanges of the beam; and attaching the continuous metal ribbon to the beam by affixing the ribbon to one of the opposing flanges at each of the bends.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 4 is a plan view of the C-channel beam of FIG. 3.

FIG. 5 is a plan view of the illustrative stiffening member of FIG. 3, shown in a flattened, pre-assembly configuration.

DESCRIPTION

Overview Various aspects and examples of a beam assembly having a continuous stiffening member, as well as related methods, are described below and illustrated in the associated drawings. Unless otherwise specified, a stiffened beam assembly according to the present teachings and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Figure 1:
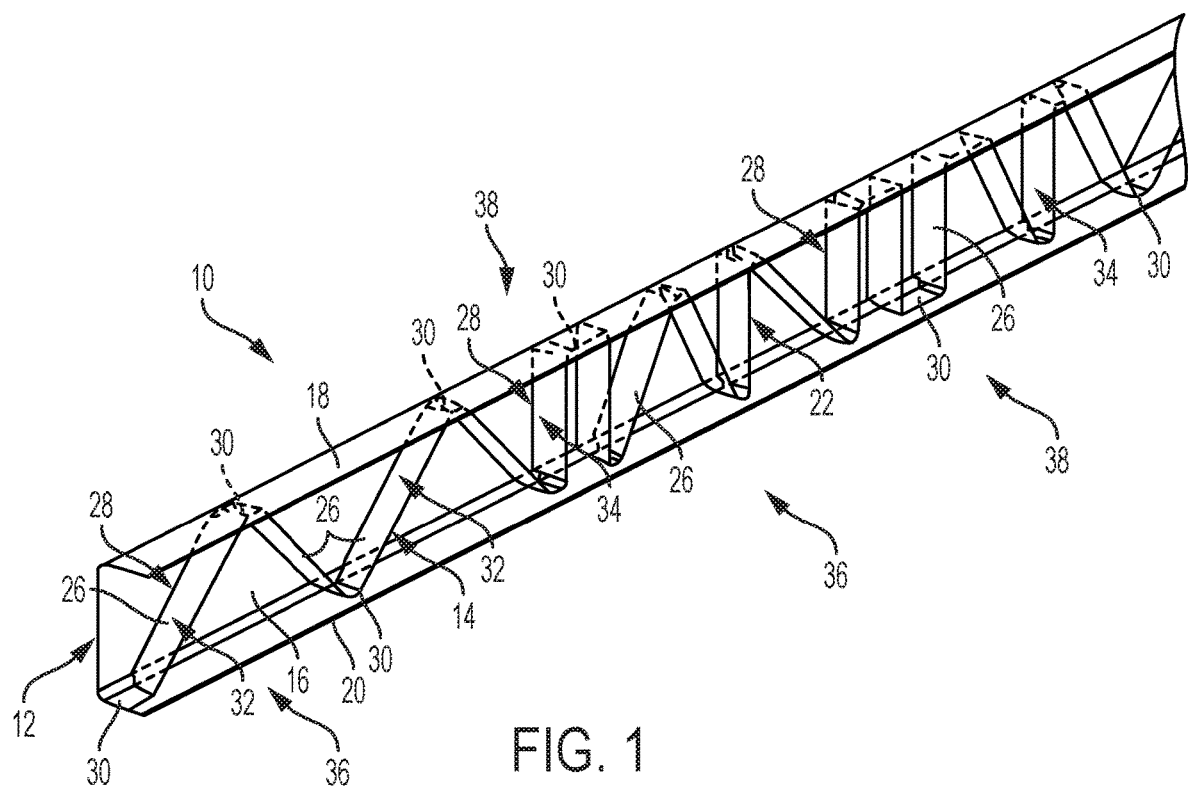
FIG. 1 is an isometric view of an illustrative stiffened beam assembly in accordance with aspects of the present disclosure.
Figure 2:
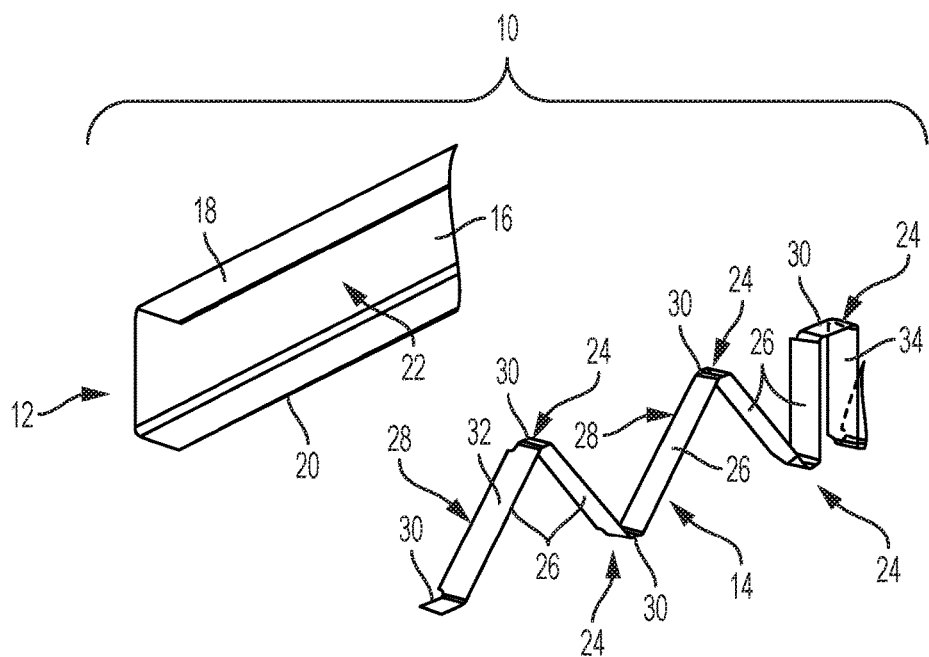
FIG. 2 is an isometric exploded view of the beam assembly of FIG. 1.

In general, and referring to FIGS. 1-2, a beam assembly 10 having a continuous stiffening member may include a beam portion 12, also referred to as a beam, and a continuous stiffening member 14, also referred to as a stiffening portion or a stiffening member portion. Beam assembly 10 may be referred to as a beam element.

As depicted in FIGS. 1 and 2, beam 12 includes a web portion 16, as well as an upper flange 18 and an opposing lower flange 20 spaced from the upper flange. Because the beam may be placed in any orientation, the upper and lower flanges may be referred to as first and second flanges, respectively. In the example depicted in FIGS. 1 and 2, beam 12 has a C-shaped cross-section, and may be described as a C-beam or C-channel.

Flanges 18 and 20 extend in a generally orthogonal direction from a same side of web portion 16, forming a three-sided recess or channel 22. In other examples, as described below, beam 12 may include other cross-sectional profiles, such as I- or H-beams, J-beams, etc., each of which has a recess similar to channel 22. In some examples, channel 22 of beam 12 may be enclosed on the fourth side, e.g., forming a box beam.

Stiffening member 14 is a continuous flat ribbon of material having a plurality of bends 24 and a corresponding plurality of straight segments (also referred to as legs) 26 configured to extend back and forth between the opposing flanges of the beam. When coupled to the beam, stiffening member 14 extends alternatingly between first flange 18 and second flange 20 along a length of beam 12. Said another way, stiffening member 14 may extend back and forth between the opposing flanges along a length of the beam. Because of this back-and-forth pattern, stiffening member 14 may be referred to as a corrugated stiffener.

Beam 12 and stiffening member 14 may comprise any suitable material or combination of materials configured to be formed into a suitable shape, such as by inelastic bending, extrusion, hydroforming, or machining, as well as to provide structural support to assembly 10. In some examples, beam 12 and stiffening member 14 comprise structural steel, steel plate, sheet metal, titanium, aluminum, and/or other suitable metals, or any combination of these. In some examples, beam 12 and stiffening member 14 comprise a plastic, such as acrylonitrile butadiene styrene (ABS), polyvinyl chloride (PVC), and/or the like, or any combination of these, or any combination of these and other materials listed above. Materials may be chosen, for example, based on the application, expected load pattern, etc.

Stiffening member 14 may be coupled to beam 12 by any suitable mechanical fastening method. For example, stiffening member 14 may be coupled to beam 12 by welding (e.g., laser welding), fastening, brazing, diffusion bonding, adhesive, and/or using mechanical fasteners such as bolts, screws, or rivets. Coupling or fastening of the member to the beam may be at any or all of the points of contact between the stiffening member and the beam. For example, an inner edge 28 of one or more of segments 26 may be seam welded or spot welded to web portion 16. In some examples, a flat portion 30 of one or more bends 24 may be spot welded to flange 18 or 20. Flat portions 30 may include any portion of a bend that is attachable to an adjacent flange. For example, flat portions 30 in the example depicted in FIGS. 1 and 2 each include a short expanse running generally parallel to flanges 18 and 20 between subsequent segments 26. Flats 30 may be any suitable size. In some examples, flats 30 may be relatively short, such as when a flat simply provides a transition from one angled segment to another. In some examples, flats 30 may be relatively long, such as when vertical segments (i.e., perpendicular to the flanges) are separated by a single flat 30. Although referred to as flat, each of the flat portions may include radiused or rounded portions, such as where the stiffening member transitions from a segment to a flat.

Segments 26 may be oriented in any suitable direction oblique relative to the long axis of the beam. For example, segments 26 may be angled, as indicated at 32. Suitable angles include 45 degrees and 60 degrees with respect to the beam, although other angles are possible. For example, segments 26 may be perpendicular (or vertical) (i.e., 90 degrees), as indicated at 34. As shown in FIGS. 1 and 2, angled and perpendicular segments may be present in any suitable combination. For example, angled segments may be used to form trusses 36 and perpendicular segments may be used to form orthogonal braces 38, depending on load requirements at different points on the beam, interfaces for mating components (not shown), and the like. As depicted in FIGS. 1 and 2, stiffening member 14 is coupled to beam 12, such that inner edge portions 28 of segments 26 are against web portion 16, and each flat portion 30 is against either flange 18 or flange 20. In some examples, stiffening member 14 is welded or otherwise mechanically joined to beam 12 at every point of contact, including inner edge 28 of each segment 26 and flat 30 of each bend 24. As mentioned above, the path of stiffening member 14, which comprises any suitable combination of angled and/or perpendicular segments, may be optimized or tailored or customized, such that the stiffened beam is capable of supporting the load requirements of beam assembly 10. Because stiffening member 14 is continuous, failure of an attachment or joint at any segment or flat will not compromise the reinforcing ability of the stiffener as much as would be the case in a traditional, stick-built beam. For example, a traditional beam, with discrete support segments, may experience a failure in which a support segment becomes disconnected from the beam and falls off or becomes dislodged. That support segment would then be unavailable for any load carrying function. On the other hand, in a beam assembly in accordance with the present teachings, any given segment will remain attached to the rest of the system even if a joint fails. Moreover, the partially disconnected segment will still be available to provide a load path.

Stiffened beam assembly 10 may be suitable for many applications. For example, one or more such beam assemblies may be used in construction of land vehicles (e.g., chassis, frames), aircraft (e.g., floor beams, fuselage frames, wing spars, wing ribs, empennage structures, and the like), marine and land-based structures (e.g., bridges, trestles, buildings, and the like), etc.

EXAMPLES, COMPONENTS, AND ALTERNATIVES

The following sections describe selected aspects of exemplary stiffened beam assemblies as well as related systems and/or methods. The examples in these sections are intended for illustration and should not be interpreted as limiting the entire scope of the present disclosure. Each section may include one or more distinct inventions, and/or contextual or related information, function, and/or structure.

Illustrative Reinforced C-Channel Beam

Figure 3:
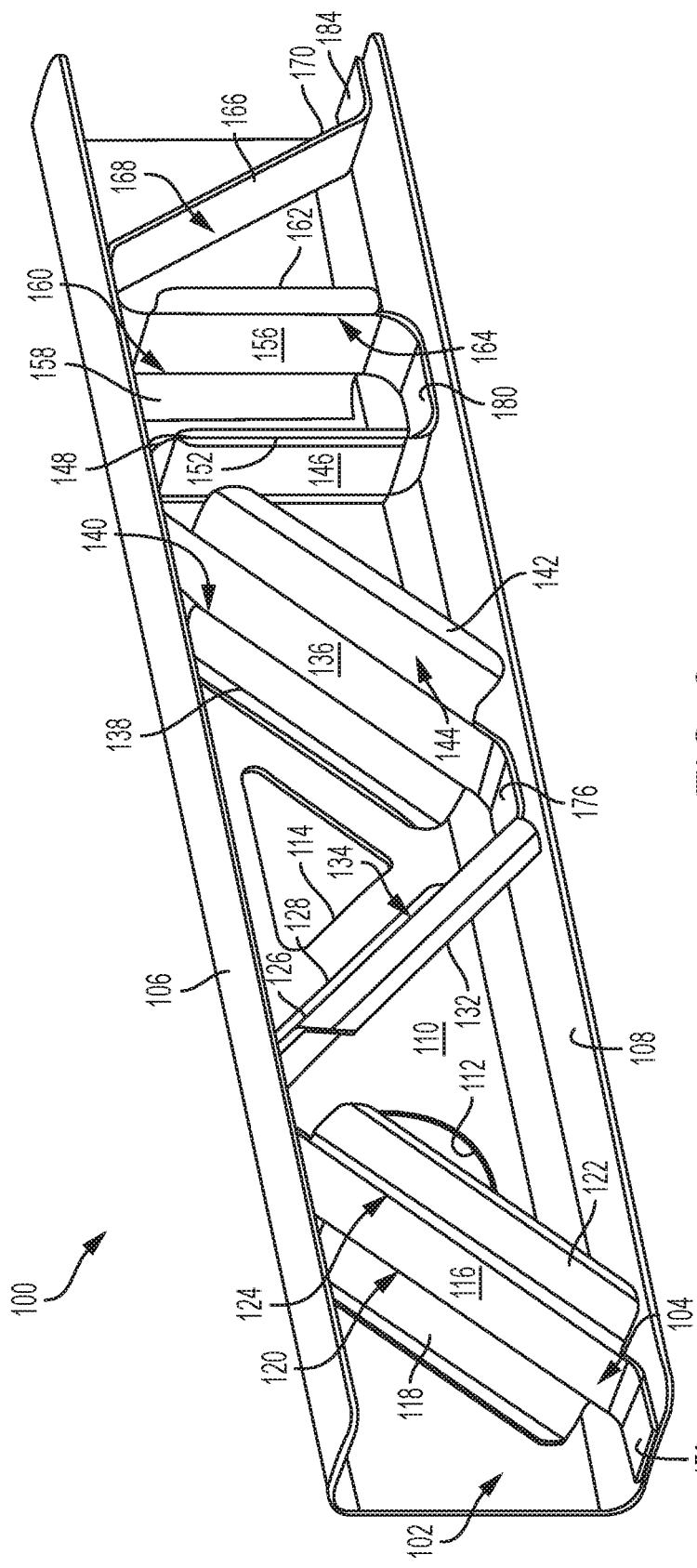
FIG. 3 is an isometric view of an illustrative C-channel beam having a continuous internal stiffening member in accordance with aspects of the present disclosure.

As shown in FIGS. 3-5, this section describes an illustrative reinforced C-channel beam assembly 100. Beam assembly 100 is similar to beam assembly 10, described above.

FIG. 3 is an isometric view of C-channel beam assembly 100, which includes a C-channel beam portion 102 and a continuous, corrugated stiffening member 104. FIG. 4 is a side elevation view of beam assembly 100. FIG. 5 is a plan view of stiffening member 104 in a flat ribbon format, prior to its reshaping into a reinforcing topology and subsequent attachment to beam portion 102.

Beam portion 102 includes a first flange 106, a second flange 108, and a web portion 110, all substantially similar to corresponding components described above with respect to beam portion 12. Web portion 110 also includes apertures or openings in the web, namely a circular aperture 112 and a triangular aperture 114. Openings such as apertures 112 and 114 may be present in a beam for any of several functional purposes. For example, such apertures may function to reduce a weight of (i.e., lighten) the overall assembly without substantially degrading the load bearing capacity. In some examples, such apertures may function to facilitate pass-through of other components, such as cableways, piping, ductwork, and the like. Although a certain number and shapes of apertures are shown in this example, any suitable shapes and/or numbers of such apertures, including more or fewer (or none) may be present. In some examples, one or more apertures may be present in stiffening member 104, either instead of or in addition to such apertures in web portion 110 of beam portion 102.

Stiffening member 104 is substantially as described with respect to stiffener 14, above, and is affixed or attached to beam portion 102 in similar fashion. Stiffening member 104 may further include side flanges. An inner edge flange may facilitate mating, clamping, and fastening of the segment to web portion 16. An outer side or free edge flange may provide improved compression strength.

For example, as shown in FIGS. 3-5, stiffening member 104 includes a series of segments: a first segment 116 having an inner edge flange 118 at an inner edge 120 and an outer or free edge flange 122 at an outer or free edge 124; a second segment 126 having an inner edge flange 128 at an inner edge 130 and an outer or free edge flange 132 at an outer or free edge 134; a third segment 136 having an inner edge flange 138 at an inner edge 140 and an outer or free edge flange 142 at an outer or free edge 144; a fourth segment 146 having an inner edge flange 148 at an inner edge 150 and an outer or free edge flange 152 at an outer or free edge 154; a fifth segment 156 having an inner edge flange 158 at an inner edge 160 and an outer or free edge flange 162 at an outer or free edge 164; an unflanged sixth segment 166 having an inner edge 168 and an outer edge 170. Each segment may include one or both of the inner and outer flanges, or none at all.

As shown in FIGS. 3 and 4, outer flanges 122, 132, 142, 152, 162 may be bent or formed or curved to extend generally at an oblique angle with respect to a plane defined by the flat central portion of the respective segment. Similarly, inner flanges 118, 128, 138, 148, 158 may extend at an oblique angle with respect to the plane of the flat central portion of the respective segment. In general, the outer flanges will extend in an opposite direction from the inner flanges. This arrangement facilitates access to the inner flanges during attachment, maintenance, and the like. In some examples, an outer flange and inner flange may extend in the same direction.

Similar to flat portions 30 of assembly 10, stiffening member 104 includes flat portions 172, 174, 176, 178, 180, 182, and 184 at respective ends of the segments described above. Each of the flat portions is in contact with and is mechanically attached to a respective flange 106 or 108 of beam portion 102. Similarly, each inner side flange of each segment is mechanically attached to web portion 110, with the exception of segment 166. Segment 166 does not have an inner side flange. Accordingly, inner edge 168 of segment 166 may be welded or otherwise fastened directly to web portion 110, as a T-joint.

As mentioned above, FIG. 5 is a plan view of the flat pattern or stamped, blank ribbon form of stiffening member 104, prior to being formed or bent into its final shape. A central ribbon 186 of material runs down the center of the blank, with side flanges extending laterally and dashed lines indicating generally where the blank will be bent to create the final shapes and flat portions.

This stamped, flat blank is shaped, e.g., by brake forming, hydroforming, and/or the like, such that segment 116 angles upward from flat portion 172 on flange 108 to flange 106, and flat portion 174 contacts flange 106. Segment 126 then angles downward from flange 106 to flange 108, and flat portion 176 contacts flange 108. Segment 136 then angles upward from flange 108 to flange 106, and flat portion 178 is in contact with flange 106. Segment 146 extends at a 90-degree angle straight down to flange 108, and flat portion 180 is in contact with flange 108, extending along flange 108 to provide a desired spacing between segments 146 and 156. Segment 156 extends generally parallel to segment 146 to flange 106, and flat portion 182 is in contact with flange 106. Segment 166 then angles downward to flange 108, and terminates in flat portion 184. As shown in the drawings, the various segments, side flanges, and flat portions comprise a single, continuous stiffening member. The segments or legs may be arranged to avoid apertures 112 and 114, provide desired load-bearing characteristics, and/or stiffen the assembly.

The particular location, length, angle, and/or other physical characteristics of the formed stiffening member, the segments, the flats, and/or the flanges may vary in accordance with the selected application of the assembly. Some or all segments may be formed with or without flanges, as desired.

Although beam portion 102 has been described as being associated with and connected to a single, continuous stiffening member 104, some examples may include more than one continuous stiffening member 104 disposed in series along beam portion 102. For example, a gap may be formed between two sequential stiffening members. For example, a plurality of stiffening members 104 may be affixed end to end in beam portion 102. Each such stiffening member 104 may be continuous in and of itself, and may have any suitable length and combination of segments, flats, and/or angles. Similar arrangements of multiple continuous stiffening members in a single beam may be present in other examples below, whether or not specifically described as such.

Illustrative Reinforced I-Beam

Figure 6:
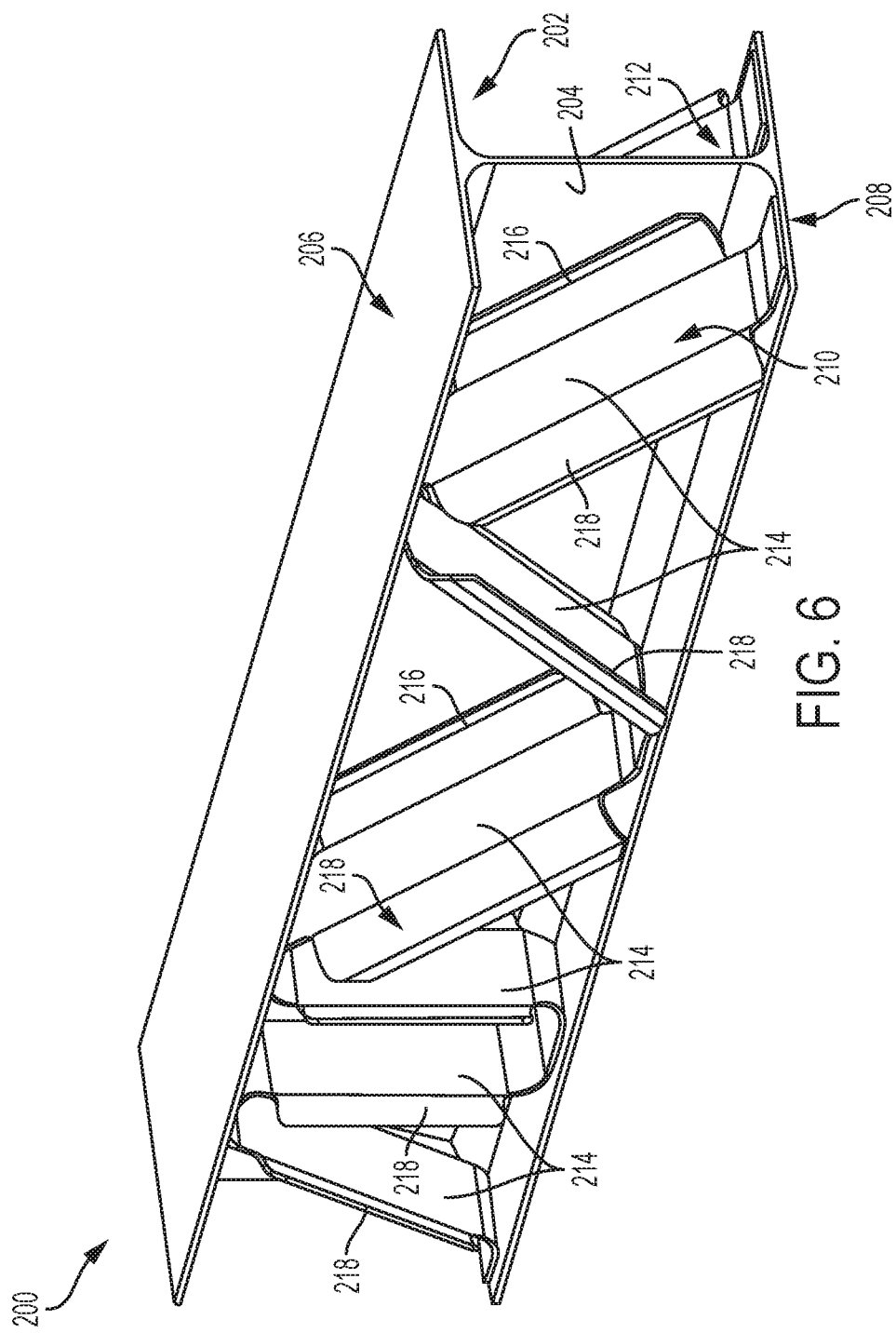
FIG. 6 is an isometric view of an illustrative I-beam, also referred to as an H-beam, having a continuous internal stiffening member in accordance with aspects of the present disclosure.

As shown in FIG. 6, this section describes an illustrative stiffened I-beam or H-beam assembly 200. Assembly 200 is similar to assemblies 10 and 100, described above.

FIG. 6 is an isometric view of an I- or H-beam having a pair of stiffening members, one on either side of the web portion. More specifically, assembly 200 includes a beam portion 202 having a web portion 204, a first flange 206 extending orthogonally in opposing directions across one edge of the web portion, and a second flange 208 extending orthogonally in opposing directions across the other edge of the web portion, thereby forming an "I" or "H" shaped profile. Simple I- or H-beams are well known in the art.

Assembly 200 further includes a first stiffening member 210 attached to one side of web portion 202 between flanges 206 and 208, and a second stiffening member 212 attached to the opposite side of web portion 202, between flanges 206 and 208.

Stiffening members 210 and 212 may be substantially as described above with respect to stiffening members 14 and/or 104, and therefore will not be described in full detail here. Members 210 and 212 may be mirror images of each other. In some examples, member 210 is arranged differently as compared with member 212. As shown in FIG. 6, stiffening member 210 has a plurality of angled and 90-degree segments 214 arranged as trusses and braces and including inner edge flanges 216 and outer edge flanges 218. Stiffening member 212 may be substantially identical, mirror image on the other side of the web. In some examples, stiffening member 212 may be omitted, such that a stiffening member is only present on one side of web portion 202.

Illustrative Reinforced J-Beam

Figure 7:
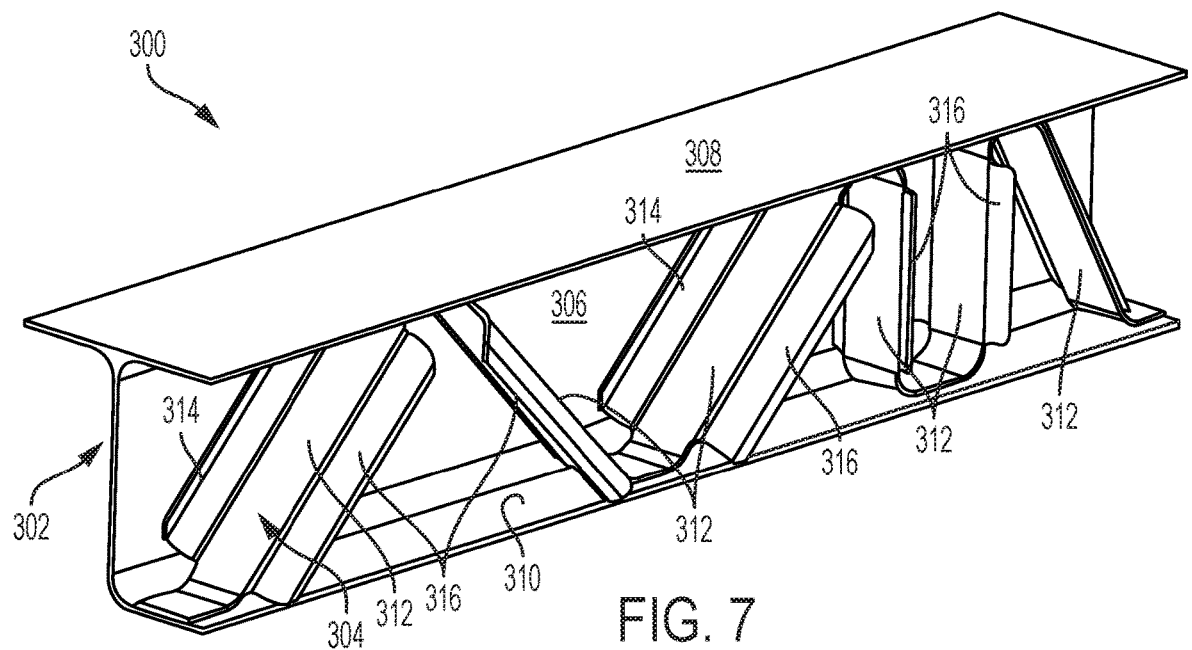
FIG. 7 is an isometric view of an illustrative J-beam having a continuous internal stiffening member in accordance with aspects of the present disclosure.
Figure 8:
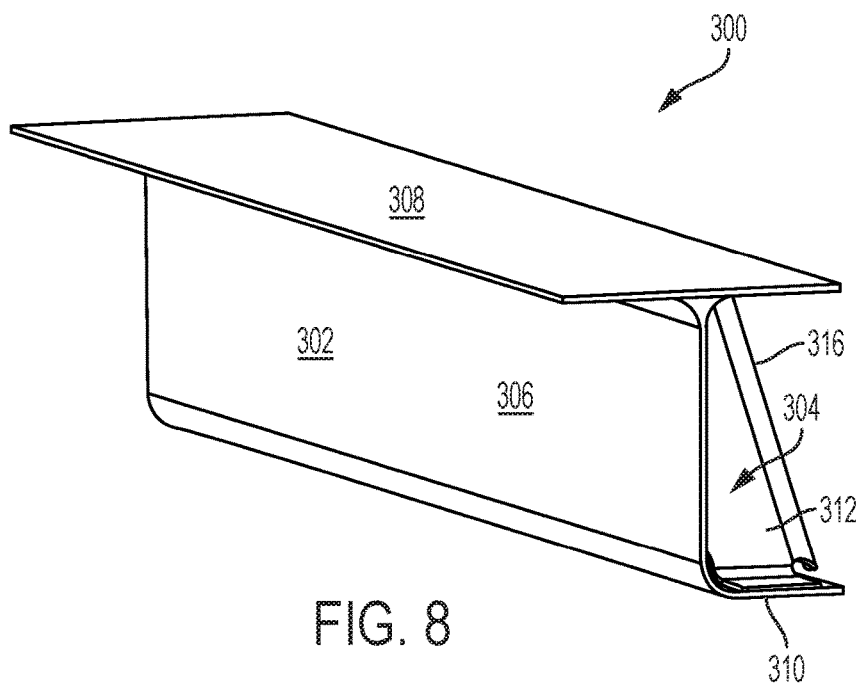
FIG. 8 is another isometric view of the J-beam of FIG. 7, taken from a reverse vantage point.

As shown in FIGS. 7-8, this section describes an illustrative reinforced J-beam assembly 300. Beam assembly 300 is similar to beam assemblies 10, 100, and 200, described above.

FIGS. 7 and 8 are isometric views of assembly 300, from two different vantage points. Assembly 300 includes a J-shaped beam portion 302 and a corrugated stiffening member 304. More specifically, assembly 300 includes beam portion 302 having a web portion 306, an upper or first flange 308 extending orthogonally in opposing directions across one edge of the web portion, and a lower or second flange 310 extending orthogonally in a single direction from the other edge of the web portion, thereby forming a "J" shaped profile.

Assembly 300 further includes stiffening member 304 attached to one side of web portion 306 between flanges 308 and 310. Stiffening member 304 may be substantially as described above with respect to stiffening members 14 and/or 104, and therefore will not be described in full detail here. As shown in FIG. 7, stiffening member 304 has a plurality of angled and 90-degree segments 312 arranged as trusses and braces and including inner edge flanges 314 and outer edge flanges 316.

Illustrative Reinforced Wing Rib

Figure 9:
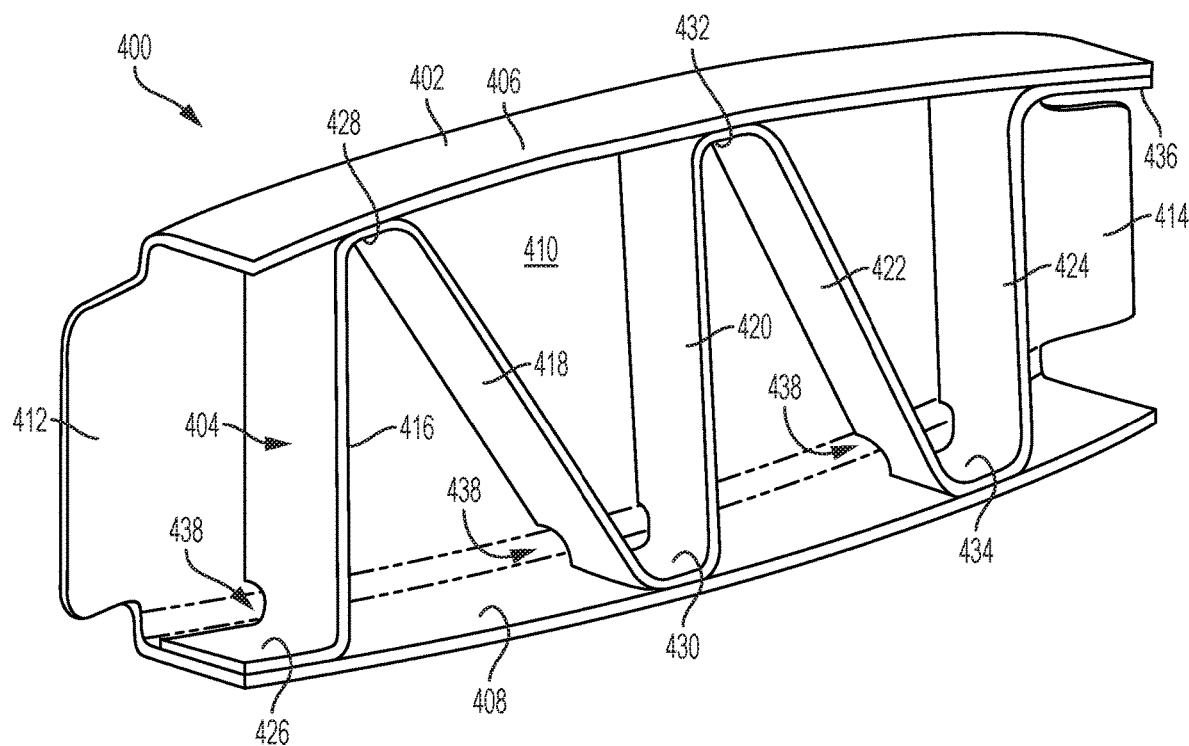
FIG. 9 is an isometric view of an illustrative C-channel beam having curvilinear flanges and a continuous internal stiffening member in accordance with aspects of the present disclosure.
Figure 10:
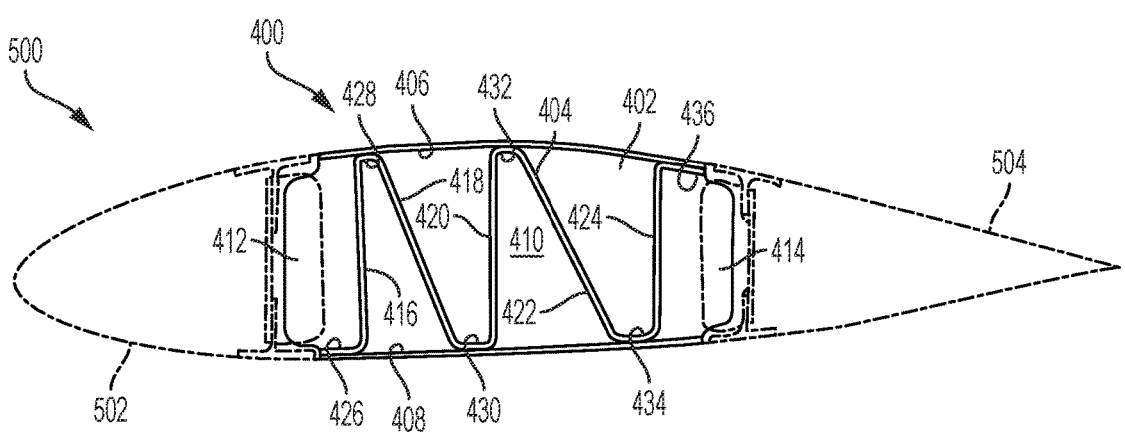
FIG. 10 is an elevation view of the C-channel beam of FIG. 9, incorporated into an illustrative wing of an aircraft.

As shown in FIGS. 9-10, this section describes an illustrative reinforced C-channel beam assembly 400 suitable for use as a portion of a wing assembly (also referred to as an airfoil assembly) for an aircraft and/or a wing or airfoil. Beam assembly 400 is similar to beam assemblies 10 and 100, described above, with selected differences described below.

FIG. 9 is an isometric view of C-channel beam assembly 400, which includes a C-channel beam portion 402 and a continuous stiffening member 404. FIG. 10 is a side elevation view of an airfoil assembly 500 incorporating beam assembly 400.

Beam portion 402 of assembly 400 includes an upper or top or first flange 406, a lower or bottom or second flange 408, and a web portion 410 oriented generally orthogonal to flanges 406 and 408. As mentioned above, one or both beam flanges may be curvilinear, straight, or a combination of these. In this example, upper flange 406 is curvilinear and concave-down along its length. Lower flange 408 is curvilinear (i.e., curved) and concave-up along its length. As shown in FIG. 10, this facilitates incorporation of beam assembly 400 into airfoil assembly 500 (e.g., as a rib of a wing).

Web portion 410 includes end tabs 412 and 414, which are tab-like extensions of the web portion, extending lengthwise in the same general plane as the web. End tabs 412 and 414 may be used to attach the beam assembly to other portions of airfoil assembly 500, or vice versa. For example, the end tabs may mate with and/or be coupled to one or more corresponding features on the airfoil assembly.

Stiffening member 404 includes a single, continuous ribbon of material formed into a series of straight segments 416, 418, 420, 422, and 424 defined at bends by flat portions 426, 428, 430, 432, 434, and 436. The flat portions of stiffening member 404 are laterally narrower than the segment portions, creating cutout or offset areas where web portion 410 transitions to flanges 406 and 408, as indicated at 438 in FIG. 9.

Turning to FIG. 10, beam assembly 400 is shown incorporated into an airfoil assembly 500. Airfoil assembly may include a wing, fin, winglet, tail, or other suitable airfoil of an aircraft. Beam assembly 400 may be incorporated into the airfoil, e.g., as a rib or other structural support. In this example, beam assembly 400 is coupled to the airfoil, such that a leading edge portion 502 is mated with the beam at tab 412, and a trailing edge portion 504 is mated with the beam at tab 414. A skin or outer wing surface may be included to cover and/or enclose the airfoil assembly. In some examples, the skin comprises flange 406 and/or flange 408 of beam 400. Airfoil assembly 500 may include a plurality of beam assemblies 400 (e.g., arranged as substantially parallel ribs along a length of the airfoil).

Illustrative Method of Manufacturing a Reinforced Beam

Figure 11:
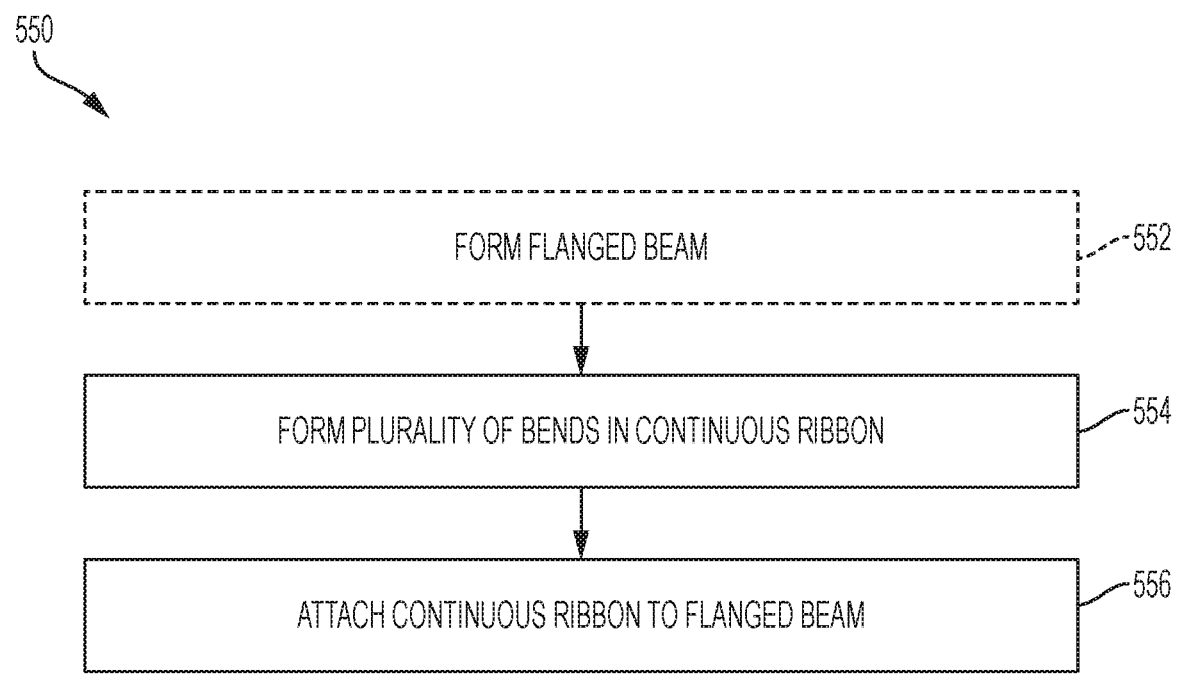
FIG. 11 is a flow chart depicting steps performed in an illustrative method for assembling a stiffened beam assembly in accordance with aspects of the present disclosure.

This section describes steps of an illustrative method for assembling or otherwise manufacturing a reinforced or stiffened beam in accordance with aspects of the present disclosure; see FIG. 11. Aspects of stiffened beam assemblies described above may be utilized in the method steps described below. Where appropriate, reference may be made to previously described components and systems that may be used in carrying out each step. These references are for illustration, and are not intended to limit the possible ways of carrying out any particular step of the method.

FIG. 11 is a flowchart illustrating steps performed in an illustrative method, and may not recite the complete process or all steps of the method. FIG. 11 depicts multiple steps of a method, generally indicated at 550, which may be performed in conjunction with stiffened beam assemblies according to aspects of the present disclosure. Although various steps of method 550 are described below and depicted in FIG. 11, the steps need not necessarily all be performed, and in some cases may be performed in a different order than the order shown.

At optional step 552, a beam is formed, the beam having a web defining a web plane and opposing flanges extending orthogonal to the web plane. For example, a C-channel beam, such as beam portion 12 or 102, may be formed by brake press or hydroforming, using sheet metal or other suitable material. Various beam profiles may be used, such as C-shaped, H-shaped, J-shaped, and others, such that at least one channel or recess is created, bounded by the web and the opposing flanges of the beam. Opposing flanges of the beam may be generally parallel to each other. In some examples, at least one of the flanges is curvilinear, or curved along a length of the beam. In some examples, the beam portion may be obtained from another party, from another process, and/or may already be present as part of a larger (e.g., host) assembly or structure.

At step 554, a plurality of bends are formed in a continuous ribbon of material (e.g., metal) to create a corresponding plurality of straight segments configured to extend back and forth between the opposing flanges of the beam. The plurality of bends may be created by any suitable method, such as using a brake press or other bending device. Any suitable pattern of right angle and/or oblique angle segments may be formed, according to desired load characteristics. The segmented and bent ribbon of material may be referred to as a stiffening member.

At step 556, the continuous metal ribbon is attached to the beam by affixing the ribbon to one of the opposing flanges at each of the bends, thereby stiffening the beam. Attaching the continuous metal ribbon to the beam may include affixing at least one segment of the ribbon to the web of the beam. Attachment may be performed using any suitable method, such as welding or bonding, or using one or more mechanical fasteners, such as bolts, rivets, or the like. The metal ribbon may include one or more side flanges to facilitate attachment and/or improve load-bearing characteristics.

Illustrative Aircraft and Associated Method

An aircraft manufacturing and service method 600 (see FIG. 12) and an aircraft 630 (see FIG. 13) will now be described to better illustrate various features of processes and systems presented herein.

Figure 12:
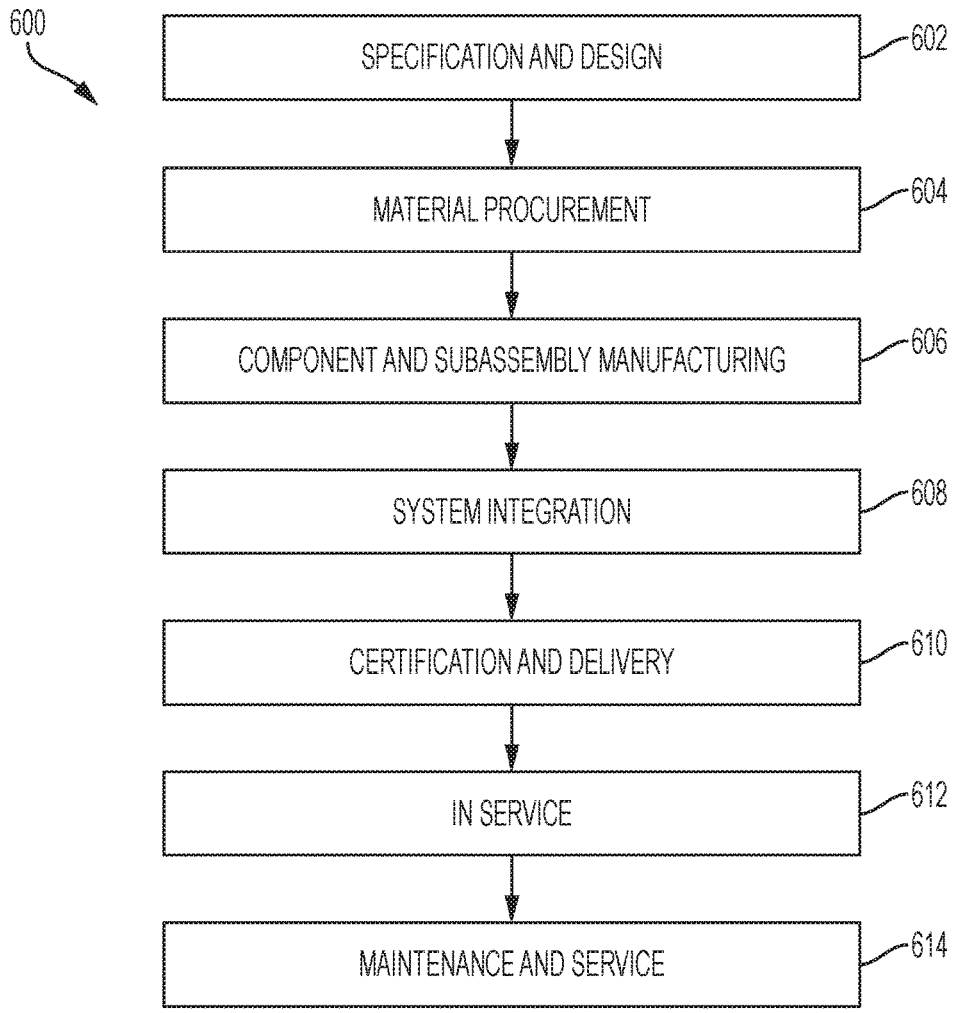
FIG. 12 is a flow chart depicting operations in the life cycle of an illustrative aircraft, from early stages of manufacturing to entering service, in accordance with aspects of the present disclosure.

As shown in FIG. 12, during pre-production, aircraft manufacturing and service method 600 may include specification and design 602 of aircraft 630 and material procurement 604. The production phase involves component and subassembly manufacturing 606 and system integration 608 of aircraft 630. Thereafter, aircraft 630 may go through certification and delivery 610 in order to be placed in service 612. While in service by a customer, aircraft 630 is scheduled for routine maintenance and service 614 (which may also include modification, reconfiguration, refurbishment, and so on). While the embodiments described herein relate generally to servicing of commercial aircraft, they may be practiced at other stages of the aircraft manufacturing and service method 600.

Each of the processes of aircraft manufacturing and service method 600 may be performed or carried out by a system integrator, a third party, and/or an operator (e.g., a customer). For the purposes of this description, a system integrator may include, without limitation, any number of aircraft manufacturers and major-system subcontractors; a third party may include, for example, any number of vendors, subcontractors, and suppliers; and an operator may include an airline, leasing company, military entity, service organization, and so on.

Figure 13:
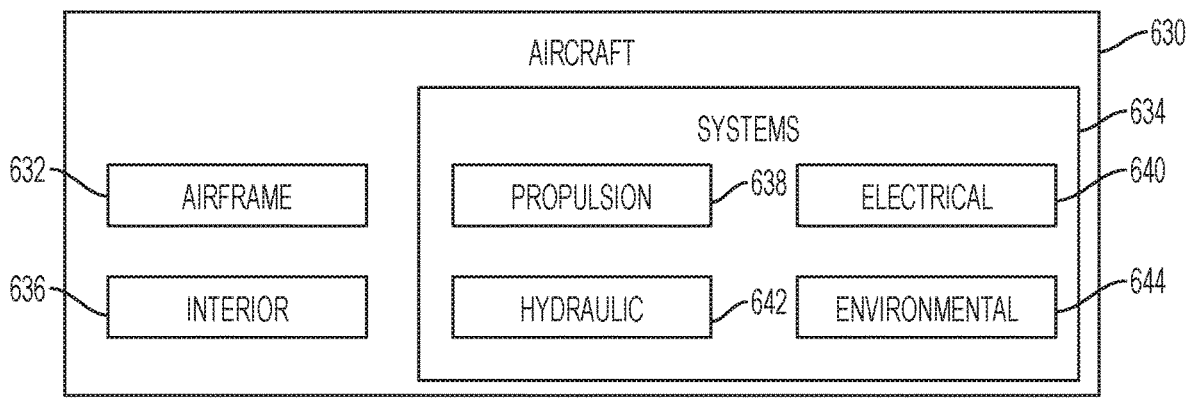
FIG. 13 is a block diagram of selected components of an illustrative aircraft, in accordance with aspects of the present disclosure.

As shown in FIG. 13, aircraft 630 produced by aircraft manufacturing and service method 600 may include an airframe 632, which may include one or more airfoils such as airfoil assembly 500, multiple systems 634, and an interior 636. Examples of systems 634 include one or more of propulsion system 638, electrical system 640, hydraulic system 642, and/or environmental system 644. Any number of other systems may be included in this example. Although an aircraft example is shown, the present teachings may be applied to other industries, such as the automotive industry.

Apparatuses and methods embodied herein may be employed during any one or more of the stages of method 600. For example, components or subassemblies corresponding to component and subassembly manufacturing 606 may be fabricated or manufactured in a manner similar to beam assemblies described above, for example using methods such as method 550.

One or more apparatus embodiments, method embodiments, or a combination thereof may be utilized during component and subassembly manufacturing 606 and system integration 608, e.g., by substantially expediting assembly of or reducing the cost of aircraft 630. Similarly, one or more of apparatus embodiments, method embodiments, or a combination thereof may be utilized while aircraft 630 is in service, e.g., during system integration 608 and/or maintenance and service 614.

ADDITIONAL ASPECTS AND EXAMPLES

This section describes additional aspects and features of stiffened beam assemblies, and related methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. An internally-stiffened structural beam assembly comprising:

an elongate beam having a web portion, a first flange, and a second flange spaced from and opposing the first flange across a face of the web portion; and one or more continuous stiffening members, each extending alternatingly between the first flange and the second flange along a respective length of the beam.

A1. The assembly of paragraph A0, wherein each continuous stiffening member forms a plurality of trusses.

A2. The assembly of any of paragraphs A0 through A1, wherein each stiffening member comprises a plurality of straight segments, each of the straight segments being fixed at a first end to the first flange and fixed at a second end to the second flange.

A3. The assembly of A2, wherein a long axis of at least one of the straight segments is oblique to the length of the beam.

A4. The assembly of A2, wherein a long axis of at least one of the straight segments is substantially normal to the length of the beam.

A5. The assembly of any of paragraphs A0 through A4, wherein the first flange and the second flange extend orthogonally with respect to the face of the web portion.

A6. The assembly of A5, wherein the beam has a C-shaped cross section.

A7. The assembly of A5, wherein the beam has a J-shaped cross section.

A8. The assembly of A5, wherein the beam has an H-shaped cross section.

A9. The assembly of any of paragraphs A0 through A8, wherein each continuous stiffening member is disposed adjacent to the face of the web portion.

A10. The assembly of any of paragraphs A0 through A9, wherein each continuous stiffening member is attached to the face of the web portion.

A11. The assembly of A10, wherein each continuous stiffening member is welded to the web portion.

A12. The assembly of any of paragraphs A0 through A11, wherein the first flange is curved along the length of the beam.

A13. The assembly of any of paragraphs A0 through A12, wherein the first flange is parallel to the second flange.

A14. The assembly of any of paragraphs A0 through A13, wherein the web portion includes at least one aperture.

B0. An internally-stiffened structural beam assembly comprising:
an elongate beam having a web portion and opposing flanges; and
a plurality of trusses coupled to the beam and spanning the web between the opposing flanges;
wherein the plurality of trusses are formed by a single continuous stiffening member extending back and forth between the opposing flanges along a length of the beam.

B1. The assembly of paragraph B0, wherein the beam comprises sheet metal.

B2. The assembly of any of paragraphs B0 through B1, wherein the stiffening member comprises a flat ribbon formed into a series of straight segments and oriented orthogonal to the web portion of the beam.

B3. The assembly of B2, wherein each segment has respective end portions affixed to at least one of the opposing flanges and an edge portion affixed to the web portion of the beam.

B4. The assembly of any of paragraphs B0 through B3, wherein the stiffening member has an edge flange welded to the web portion of the beam.

B5. The assembly of B4, wherein the stiffening member has a stiffening flange disposed opposite to the edge flange.

B6. The assembly of any of paragraphs B0 through B5, wherein at least one of the opposing flanges of the beam is curvilinear.

B7. The assembly of any of paragraphs B0 through B6, wherein the opposing flanges are substantially parallel to each other.

B8. The assembly of any of paragraphs B0 through B7, wherein the beam has a C-shaped cross section.

C0. A method of assembling a reinforced structural beam, the method comprising:
forming a plurality of bends in a continuous metal ribbon to create a corresponding plurality of straight segments configured to extend back and forth between opposing flanges of a beam, the opposing flanges of the beam extending orthogonal to a web plane defined by a web of the beam;
attaching the continuous metal ribbon to the beam by affixing the ribbon to one of the opposing flanges at each of the bends.

C1. The method of paragraph C0, wherein attaching the continuous metal ribbon to the beam further comprises affixing at least one segment of the ribbon to the web of the beam.

C2. The method of any of paragraphs C0 through C1, wherein the beam comprises sheet metal.

C3. The method of any of paragraphs C0 through C2, wherein the beam has a C-shaped cross section.

C4. The method of any of paragraphs C0 through C3, wherein the opposing flanges are parallel to each other.

C5. The method of any of paragraphs C0 through C4, wherein at least one of the opposing flanges is curvilinear.

C6. The method of any of paragraphs C0 through C5, further including forming them beam having the web and the opposing flanges, wherein forming the beam comprises hydroforming.

C7. The method of any of paragraphs C0 through C6, wherein forming the plurality of bends comprises forming the plurality of bends using a brake press.

D0. An airfoil comprising: a leading edge portion of an airfoil;
a trailing edge portion of an airfoil; and
one or more reinforced rib portions connecting the leading edge portion and the trailing edge portion, each reinforced rib portion including an elongate beam having a web portion, a first flange, and a second flange spaced from and opposing the first flange across a face of the web portion, and one or more continuous stiffening members, each stiffening member extending alternatingly between the first flange and the second flange along a respective length of the beam.

D1. The airfoil of D0, further including a skin enclosing an upper and a lower surface of the airfoil.

D2. The airfoil of D1, wherein the skin comprises the beam portion of at least one of the reinforced rib portions.

D3. The airfoil of any of paragraphs D0 through D2, wherein the rib portions are disposed substantially parallel to each other along a length of the airfoil.

E0. An aircraft comprising:
an airframe including an airfoil;
the airfoil portion comprising an elongate beam having a web portion and opposing flanges, a plurality of trusses coupled to the beam and spanning the web between the opposing flanges;
wherein the plurality of trusses are formed by at least one single continuous stiffening member extending back and forth between the opposing flanges along a respective length of the beam.

E1. The aircraft of E0, wherein the airfoil comprises a wing of the aircraft.

E2. The aircraft of E0 or E1, wherein the elongate beam comprises a transverse rib of the airfoil.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An internally-stiffened structural beam assembly comprising:
an elongate beam having a length and a web portion extending along the length of the beam, a first flange, and a second flange spaced from and opposing the first flange across an exterior face of the web portion; and
one or more stiffening members attached to the exterior face of the web portion, each comprising a continuous ribbon having a plurality of bends and extending alternatingly between the first flange and the second flange along the length of the beam, wherein each bend of the plurality of bends of the continuous ribbon is affixed to either the first flange or the second flange.

2. The assembly of claim 1, wherein each stiffening member forms a plurality of trusses.

3. The assembly of claim 1, wherein each stiffening member comprises a plurality of straight segments, each of the straight segments being fixed at a first end to the first flange and fixed at a second end to the second flange.

4. The assembly of claim 3, wherein a long axis of at least one of the straight segments is oblique to the length of the beam.

5. The assembly of claim 1, wherein the beam has a C-shaped cross section.

6. The assembly of claim 1, wherein the first flange is curved along the length of the beam.

7. The assembly of claim 1, wherein each stiffening member has an edge flange fixed to the web portion of the beam.

8. The assembly of claim 7, wherein each stiffening member has a stiffening flange disposed opposite to the edge flange.

9. The assembly of claim 1, wherein the continuous ribbon comprises a plastic.

10. The assembly of claim 1, wherein the continuous ribbon comprises a metal.

11. A method of assembling a reinforced structural beam, the method comprising:
    forming a plurality of bends in a continuous ribbon to create a corresponding plurality of straight segments configured to extend back and forth between opposing flanges of a beam, the opposing flanges of the beam extending orthogonal to a web plane defined by a web of the beam; and
    attaching the continuous ribbon to the beam by disposing the ribbon adjacent an exterior face of the web of the beam and affixing the ribbon to the exterior face of the web and to one of the opposing flanges at each of the bends.

12. The method of claim 11, wherein attaching the continuous ribbon to the beam further comprises affixing at least one segment of the ribbon to the web of the beam.

13. The method of claim 12, wherein the ribbon comprises a plastic and affixing the at least one segment of the ribbon includes welding the ribbon.

14. An airfoil comprising:
    a leading edge portion of the airfoil;
    a trailing edge portion of the airfoil; and
    one or more reinforced rib portions spanning a gap between the leading edge portion and the trailing edge portion, each reinforced rib portion including an elongate beam having a web portion, a first flange, and a second flange spaced from and opposing the first flange across a face of the web portion, and one or more continuous stiffening members disposed adjacent the face of the web portion, each stiffening member comprising a continuous ribbon having a plurality of bends and extending alternatingly between the first flange and the second flange along a respective length of the beam, wherein the continuous ribbon is affixed to one of the first and second flanges at each of the bends.

15. The airfoil of claim 14, further including a skin enclosing an upper and a lower surface of the airfoil.

16. The airfoil of claim 15, wherein the skin comprises the enlongate beam of at least one of the reinforced rib portions.

17. The airfoil of claim 14, wherein the rib portions are disposed substantially parallel to each other along a length of the airfoil.

18. The airfoil of claim 14, further comprising an aircraft having an airframe including the airfoil.

19. The airfoil of claim 18, wherein the airfoil comprises a wing of the aircraft.

20. The airfoil of claim 14, wherein the continuous ribbon comprises a plastic material.

* * * * *